United States Patent
Saito et al.

(10) Patent No.: US 6,474,218 B2
(45) Date of Patent: Nov. 5, 2002

(54) HYDROSTATIC CONTINUOUSLY VARIABLE TRANSMISSION

(75) Inventors: Mitsuru Saito, Saitama (JP); Yoshihiro Yoshida, Saitama (JP); Kazuhiro Takeuchi, Saitama (JP); Yasushi Fujimoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/918,434

(22) Filed: Aug. 1, 2001

(65) Prior Publication Data

US 2002/0020289 A1 Feb. 21, 2002

(30) Foreign Application Priority Data

Aug. 1, 2000 (JP) ........................................ 2000-232953

(51) Int. Cl.⁷ ................................................ F01B 29/00
(52) U.S. Cl. ............................................. 92/128; 92/71
(58) Field of Search ...................... 92/71, 128; 91/499, 91/501; 417/269

(56) References Cited

U.S. PATENT DOCUMENTS 4,007,663 A * 2/1977 Nagatomo et al. ........ 91/499 X
4,534,271 A * 8/1985 Forster ..................... 91/499 X
6,361,282 B1 * 3/2002 Wanschura ................. 92/71 X

FOREIGN PATENT DOCUMENTS

JP A9303525 11/1997

* cited by examiner

*Primary Examiner*—John E. Ryznic
(74) *Attorney, Agent, or Firm*—Birch, Stewart, Kolasch & Birch, LLP

(57) ABSTRACT

A swash plate type hydraulic pump and a swash plate type hydraulic motor in formed in combination to reduce the amount of oil leakage and to increase efficiency in a hydrostatic continuously variable transmission. A hydrostatic continuously variable transmission including a swash plate type hydraulic pump, a swash plate type hydraulic motor, and a hydraulic closed circuit disposed between the hydraulic pump and the hydraulic motor. The hydraulic pump is integrally combined with the hydraulic motor by an output shaft press-fitted in a cylinder block B in which pump cylinder bores and motor cylinder bores are formed in parallel to the output shaft. The diameters of back portions of the pump cylinder bore and the motor cylinder bore are larger relative to the diameters of entry portions to the pump cylinder bore and the motor cylinder bore. Wherein a press-fitting portion is not provided at the contact portions inside the entry portions with the output shaft.

12 Claims, 2 Drawing Sheets

HYDROSTATIC CONTINUOUSLY VARIABLE TRANSMISSION

CROSS-REFERENCE TO RELATED APPLICATIONS

The present application claims priority of Japanese Patent Application No. 2000-232953 filed on Aug. 1, 2000, the entire contents thereof are hereby incorporated by reference.

BACKGROUND OF THE INVENTION

1. Field of the Invention

The present invention relates to an improvement in a hydrostatic continuously variable transmission including a combination of a swash plate type hydraulic pump and a swash plate type hydraulic motor.

2. Description of Background Art

A hydrostatic continuously variable transmission including a swash plate type hydraulic pump, a swash plate type hydraulic motor, and a hydraulic closed circuit disposed between the hydraulic pump and the hydraulic motor, wherein the hydraulic pump is integrally combined with the hydraulic motor by an output shaft press-fitted in a cylinder block in which a pump cylinder bore and a motor cylinder bore are made in parallel to the output shaft, is disclosed, for example, in Japanese Unexamined Patent Publication No. 303525/1997. In this kind of conventional hydrostatic continuously variable transmission, the cylinder bore (piston chamber) is deformed at the directly outside portion where the output shaft is press-fitted into the cylinder block by the effect of press-fitting the output shaft to make it impossible to keep its circular cross section As a result, this inevitably enlarges the inner diameter of the cylinder bore and hence increases the gap between a piston and the inner wall of the cylinder bore, which presents a problem of increasing oil leakage and reducing efficiency.

SUMMARY AND OBJECTS OF THE INVENTION

In order to solve the above-mentioned problem presented by the conventional hydrostatic continuously variable transmission, the present invention proposes a hydrostatic continuously variable transmission including a hydraulic pump, a hydraulic motor, and a hydraulic closed circuit disposed between the hydraulic pump and the hydraulic motor, wherein the hydraulic pump is integrally combined with the hydraulic motor by an output shaft press-fitted in a cylinder block in which pump cylinder bores and motor cylinder bores are made in parallel to the output shaft, and characterized in that the diameters of the back portions of the pump cylinder bore and the motor cylinder bore are larger than the diameters of their entry portions and that a press-fitting portion is not provided at the contact portions with the output shaft inside the entry portions thereof.

Since the present invention is constituted as described above and the diameters of the back portions of the pump cylinder bore and the motor cylinder bore are made larger than the diameters of their entry portions, even if the cylinder bore is deformed by press-fitting the output shaft, the interference between the cylinder bore and the piston can therefore be prevented.

Since a press-fitting portion is not made at the contact portions with the output shaft inside the entry portions of the cylinder bores, the entry portions of the cylinder bores are not deformed. Therefore, the inner diameters of the entry portions can be determined so that the cylinder bores can maintain suitable clearances with respect to a pump piston and a motor piston. As a result, this can prevent an excessive leakage of oil and a decrease in efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
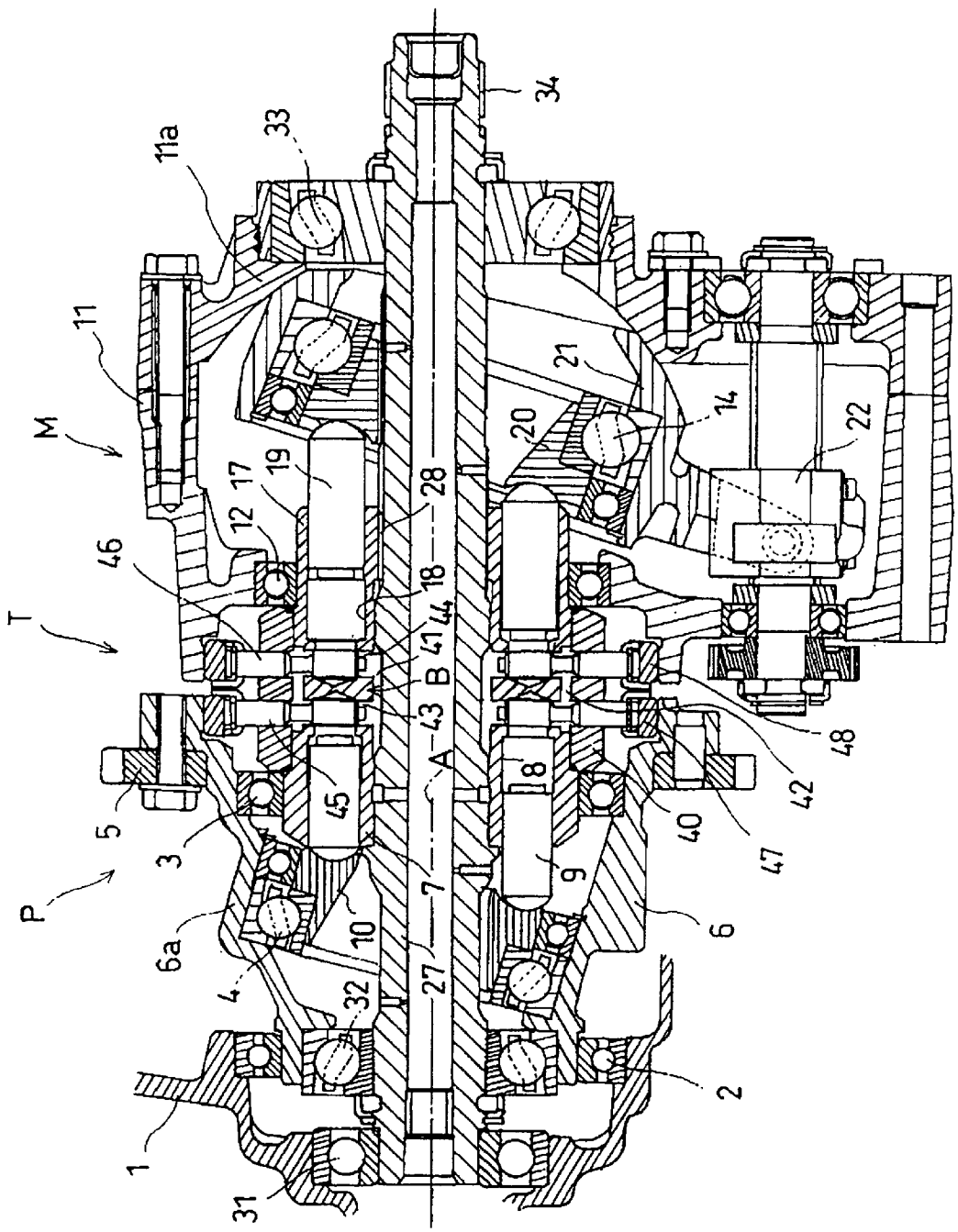
FIG. 1 is a longitudinal cross-sectional view to show one preferred embodiment of a hydrostatic continuously variable transmission in accordance with the present invention.

As illustrated in FIG. 1, the left-hand portion shows a fixed displacement swash plate type hydraulic pump P and the right-hand portion shows a variable displacement swash plate type hydraulic motor M. The hydraulic pump P and the hydraulic motor M constitute a continuously variable transmission T.

The hydraulic pump P includes an input cylindrical shaft 6 rotatably supported by a casing 1 via a bearing 2. A pump cylinder 7 is relatively rotatably supported by the input cylindrical shaft 6 via a bearing 3. A plurality of an odd number of pump pistons 9, each of which is slidably fitted in each of a plurality of an odd number of cylindrical bores 8 formed in the pump cylinder 7, are annularly arranged around its rotational axis A. A pump dimple plate 10 includes a front surface for contacting with the outside ends of the pump pistons 9. A part of the input cylindrical shaft 6 forms a pump swash plate 6a and supports the pump dimple plate 10 via a bearing 4 and the like such that the pump dimple plate 10 keeps its position tilted at a predetermined angle with respect to the axis A of the pump cylinder 7.

An input gear connected to a crank shaft, not shown, is fixed to the right-hand end of the input cylindrical shaft 6.

When the input cylindrical shaft 6 rotates, the pump swash plate 6a reciprocates the respective pump pistons 9 via the pump dimple plate 10 to make them repeat suction strokes and discharge strokes.

On the other hand, the hydraulic motor M includes a motor cylinder 17 rotatably supported by a casing 11 and arranged coaxially with the pump cylinder 7 at the right-hand side thereof via a bearing 12. A plurality of an odd number of motor pistons 19, each of which is slidably fitted in each of a plurality of an odd number of cylinder bores 18 formed in the motor cylinder 17, are annularly arranged around a rotational axis A. A motor dimple plate 20 includes a front surface for contacting with the outside ends of the motor pistons 19. A motor swash plate 21 is provided for supporting the motor dimple plate 20 via a bearing 14 and the like.

A part of the casing 11 forms a motor swash plate anchor 11a and supports the back surface of the motor swash plate 21. The back surface of the motor swash plate 21 and the front surface of the motor swash plate anchor 11 a form a spherical surface and are in contact with each other and the tilting angle of the motor swash plate 21 and the motor dimple plate 20 can be set at an arbitrary angle by means of a screw drive mechanism 22. When the motor cylinder 17 rotates in a state where the motor swash plate 21 is tilted, it reciprocates the motor pistons 19 to make them repeat expansion strokes and contraction strokes.

The pump cylinders 7 and the motor cylinders 17 are integrally formed to constitute a cylinder block B and an output shaft 27 is press-fitted through the center portion of the cylinder block B. A spline 28 is made between the cylinder block B and the output shaft 27 to connect them in the rotational direction. In this case, portions designated by reference characters 29, 29 at the inner sides of the back portions 8a, 18a of the cylinder bores 8, 18 become press-fitting portions and portions designated by reference characters 30, 30 at the inner sides of the entry portions 8b, 18b of the cylinder bores 8, 18 become loose portions (see FIG. 2).

Further, the output shaft 27 is rotatably supported at the left end by the casing 1 via a bearing 31 and is relatively rotated with respect to the input cylindrical shaft 6 via a bearing 32 disposed between them and is rotatably supported at a portion near the right end by the casing 11 via a bearing 33. Further, a spline 34 is made at the right end to connect the output shaft 27 to a driving shaft of a vehicle not shown.

Figure 2:
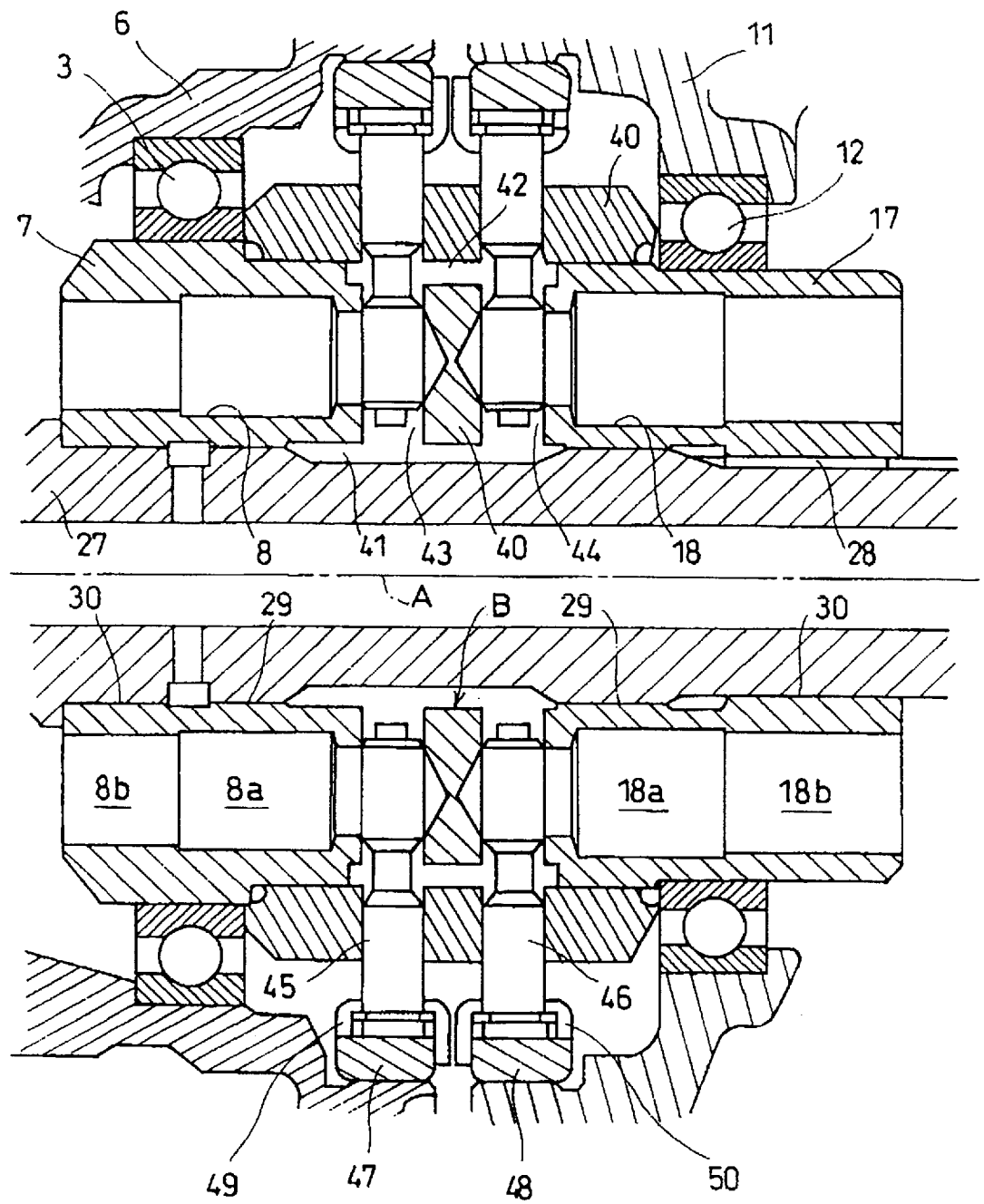
FIG. 2 is an enlarged view to show the vicinity of a cylinder block in FIG. 1 and shows a state in which a piston is removed from a cylinder bore.

As shown in FIGS. 1 and 2, between the pump cylinder 7 and the motor cylinder 17, an annular inside oil passage (low pressure oil passage) 41 is formed between the inner peripheral surface of the cylinder block B and the outer peripheral surface of the press-fitted output shaft 27, and an annular outside oil passage (high pressure oil passage) 42 is formed between the outer peripheral surface of the cylinder block B and a sleeve 40 fitted over and brazed to the outer peripheral surface of the cylinder block B. Further, a first group of valve bores 43 and a second group of valve bores 44 are made radially through the annular wall between both the oil passages 41 and 42 and the sleeve 40 such that they abut on the group of cylinder bores 8 and the group of cylinder bores 18. The respective first valve bores 43 communicate with the respective abutting cylinder bores 8 and the respective second valve bores 44 communicate with the respective abutting cylinder bores 18. A spool type first distributor valve 45 is fitted in each of the first valve bores 43 and a spool type second distributor valve 46 is fitted in each of the second valve bores 44.

The outer periphery of the first distributor valve 45 is connected to the first slip ring 47 fitted in the input cylindrical shaft 6 by means of the first expansion ring 49 concentric with it such that it is always in contact with the first slip ring 47, and the outer periphery of the second distributor valve 46 is connected to the second slip ring 48 fitted in the casing 11 by means of the second expansion ring 50 such that it is always in contact with the second slip ring 48. The axes of the first slip ring 47 and the second slip ring 48 are eccentric in the direction crossing the paper with respect to the rotational axis A of the cylinder block B. The amount and direction of eccentricity of the first slip ring 47 are not identical to the amount and direction of eccentricity of the second slip ring 48.

When a relative rotation is produced between the input cylindrical shaft 6 of the hydraulic pump P and the pump cylinder 7 thereof, the respective first distributor valves 45 are reciprocated in the respective first valve bores 43. In the discharge region of the hydraulic pump P, the first distributor valve 45 moves toward the inner end side of the first valve bore 43 to make the corresponding cylinder bore 8 communicate with the outside oil passage 42 and to shut the communication between the cylinder bore 8 and the inside oil passage 41, whereby the working oil is pumped from the cylinder bore 8 to the outside oil passage 42 by the pump piston 9 in the discharge stroke. Further, in the suction region, the first distributor valve 45 moves toward the outer end side of the first valve bore 43 to make the corresponding cylinder bore 8 communicate with the inside oil passage 41 and to shut the communication between the cylinder bore 8 and the outside oil passage 42, whereby the working oil is drawn from the inside oil passage 41 to the cylinder bore 8 by the pump piston 9 in the suction stroke.

On the other hand, when the motor cylinder 17 of the hydraulic motor M rotates, the respective distributor valves 46 are reciprocated in the respective valve bores 44. In the expansion region of the hydraulic motor M, the second distributor valve 46 moves to the inner end side of the second valve bore 44 to make the corresponding cylinder bore 18 communicate with the outside oil passage 42 and to shut the communication between the cylinder bore 18 and the inside oil passage 41, whereby the high-pressure working oil is supplied from the outside oil passage 42 to the cylinder bore 18 of the motor piston 19 in the expansion stroke. Further, in the contraction region, the second distributor valve 46 moves toward the outer end side of the second valve bore 44 to make the corresponding cylinder bore 18 communicate with the inside oil passage 41 and to shut the communication between the cylinder bore 18 and the outside oil passage 42, whereby the working oil is returned from the cylinder bore 18 of the motor piston 19 in the contraction stroke to the inside oil passage 41.

In this way, the cylinder block B is rotated by the sum of a reactive torque applied by the pump swash plate 6a via the piston pump 9 in the discharge stroke and a reactive torque applied by the motor swash plate 21 via the motor piston 19 in the expansion stroke and its rotational torque is transmitted to the output shaft 27.

By changing the tilting angle of the motor swash plate 21 and the motor dimple plate 20 via the screw drive mechanism 22, a transmission gear ratio can be continuously variably controlled.

In the present preferred embodiment, as shown in FIG. 2, the diameters of the back portions 8a, 18a of the pump cylinder bore 8 and the motor cylinder bore 18 are larger than the diameters of the entry portions 8b, 18b by about 0.5 mm to 1.0 mm.

Since the back portions 8a, 18a are positioned directly adjacent to the portions 29, 29 where the output shaft 27 is press-fitted in the cylinder block B, as described above, the cylinder bores 8, 18 are deformed by the effect of the press-fitting of the output shaft 27 into the cylinder block B and the cylinder bores 8, 18 can-not keep their circular cross sections. Therefore, conventionally, the inner diameters of the cylinder bores 8, 18 are made larger, that is, the gap between the PUMP piston 9 and the cylinder bore 8 and the gap between the motor piston 19 and the cylinder bore 18 are enlarged, but the present preferred embodiment is intended to prevent interference between tie cylinder bore 8 and the pump piston 9 and interference between the cylinder bore 18 and the motor piston 19 by enlarging only the diameters of the back portions 8a and 18a of the cylinder bores 8 and 18a.

Since the entry portions 8b, 18b of the cylinder bores 8, 18 are positioned outside the portions 30, 30 where the output shaft 27 is loosely inserted into the cylinder block B, the cylinder bores 8, 18 are not deformed there and hence their inner diameters can be determined so that the cylinder bores 8, 18 can keep suitable gaps with respect to the pump piston 9 and the motor piston 19. If the gap between the cylinder bore 8 and the pump piston 9 and the gap between the cylinder bore 18 and the motor piston 19 are suitable, they can prevent an excessive leaking of working oil and a decrease in efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydrostatic continuously variable transmission comprising:

a cylinder block including a pump cylinder bore and a motor cylinder bore;

a swash plate type hydraulic pump;

a swash plate type hydraulic motor;

a hydraulic closed circuit disposed between the hydraulic pump and the hydraulic motor;

an output shaft press-fitted in said cylinder block for integrally combining said hydraulic pump with the hydraulic motor, said pump cylinder bore and said motor cylinder bore are formed in said cylinder block in parallel to the output shaft;

diameters of back portions of the pump cylinder bore and the motor cylinder bore are larger relative to diameters of entry portions of the pump cylinder bore and the motor cylinder bore; and said output shaft being press-fitting in a predetermined portion of said cylinder block wherein said entry portion of said pump cylinder bore and the entry portion of the motor cylinder bore are not deformed during the press-fitting of the output shaft.

2. The hydrostatic continuously variable transmission according to claim 1, wherein a pump piston is slidably positioned within said entry portion of said pump cylinder bore and a motor piston is slidable positioned within said entry portion of said motor cylinder bore for reducing oil leakage.

3. The hydrostatic continuously variable transmission according to claim 1, wherein said hydraulic pump includes a plurality of pump cylinder bores and pump pistons annularly arranged around a rotational axis of said output shaft.

4. The hydrostatic continuously variable transmission according to claim 1, wherein said hydraulic motor includes a plurality of motor cylinder bores and motor pistons annularly arranged around a rotational axis of said output shaft.

5. The hydrostatic continuously variable transmission according to claim 1, wherein said output shaft is press-fitted in a predetermined portion of said cylinder block wherein said back portion of said pump cylinder bore is deformed during the press-fitting of the output shaft.

6. The hydrostatic continuously variable transmission according to claim 1, wherein said output shaft is press-fitted in a predetermined portion of said cylinder block wherein said back portion of said motor cylinder bore is deformed during the press-fitting of the output shaft.

7. A hydrostatic continuously variable transmission comprising:

a cylinder block;

a swash plate type hydraulic pump formed in said cylinder block;

a swash plate type hydraulic motor formed in said cylinder block;

a hydraulic flow path extending between the hydraulic pump and the hydraulic motor;

an output shaft press-fitted in said cylinder block for integrally combining said hydraulic pump with the hydraulic motor, said pump cylinder bore and said motor cylinder bore being formed in said cylinder block and extending substantially in parallel to the output shaft;

said pump cylinder bore having an entry portion and a back portion, a diameter of the back portion of the pump cylinder bore is larger relative to diameter of entry portions of the pump cylinder bore;

said motor cylinder bore having an entry portion and a back portion, a diameter of the back portion of the motor cylinder bore is larger relative to diameter of entry portions of the motor cylinder bore; and said output shaft being press-fitting in a predetermined portion of said cylinder block wherein said entry portion of said pump cylinder bore and the entry portion of the motor cylinder bore are not deformed during the press-fitting of the output shaft.

8. The hydrostatic continuously variable transmission according to claim 7, wherein a pump piston is slidably positioned within said entry portion of said pump cylinder bore and a motor piston is slidable positioned within said entry portion of said motor cylinder bore for reducing oil leakage.

9. The hydrostatic continuously variable transmission according to claim 7, wherein said hydraulic pump includes a plurality of pump cylinder bores and pump pistons annularly arranged around a rotational axis of said output shaft.

10. The hydrostatic continuously variable transmission according to claim 7, wherein said hydraulic motor includes a plurality of motor cylinder bores and motor pistons annularly arranged around a rotational axis of said output shaft.

11. The hydrostatic continuously variable transmission according to claim 7, wherein said output shaft is press-fitted in a predetermined portion of said cylinder block wherein said back portion of said pump cylinder bore is deformed during the press-fitting of the output shaft.

12. The hydrostatic continuously variable transmission according to claim 7, wherein said output shaft is press-fitted in a predetermined portion of said cylinder block wherein said back portion of said motor cylinder bore is deformed during the press-fitting of the output shaft.

* * * * *